United States Patent [19]
Loudermilk et al.

[11] Patent Number: 5,955,201
[45] Date of Patent: Sep. 21, 1999

[54] INORGANIC/ORGANIC INSULATING COATING FOR NONORIENTED ELECTRICAL STEEL

[75] Inventors: Dannie S. Loudermilk, Cincinnati; Jack L. Brown, Zanesville, both of Ohio

[73] Assignee: Armco Inc., Middletown, Ohio

[21] Appl. No.: 08/994,387

[22] Filed: Dec. 19, 1997

[51] Int. Cl.$^6$ .................................................. C23C 30/00
[52] U.S. Cl. ......................... 428/450; 428/457; 428/469; 428/494; 428/681; 428/689; 428/704; 524/417; 336/219
[58] Field of Search ...................... 428/457, 465, 428/469, 492, 494, 681, 689, 704, 450; 336/219; 524/417

[56] References Cited

U.S. PATENT DOCUMENTS

| | | | |
|---|---|---|---|
| 2,501,846 | 7/1950 | Gifford | 148/6.15 |
| 2,743,203 | 8/1956 | Steinherz | 148/6.15 |
| 3,793,073 | 2/1974 | Kitayama et al. | 117/230 |
| 3,839,256 | 10/1974 | Parkinson | 260/29.6 WB |
| 4,255,205 | 3/1981 | Morito et al. | |
| 4,288,492 | 9/1981 | Hiromae et al. | |
| 4,496,399 | 1/1985 | Haselkom | 148/6.15 R |
| 4,507,360 | 3/1985 | Perfetti | 428/336 |
| 4,618,377 | 10/1986 | Nakamura et al. | 148/6.15 R |
| 4,762,753 | 8/1988 | Perfetti | 428/450 |
| 4,844,753 | 7/1989 | Katayama et al. | 148/251 |
| 4,875,947 | 10/1989 | Nakayama et al. | |

*Primary Examiner*—Deborah Jones
*Assistant Examiner*—Jason Savage
*Attorney, Agent, or Firm*—Robert J. Bunyard; Larry A. Fillnow

[57] ABSTRACT

The present invention relates to a nonoriented electrical steel sheet coated on both surfaces with a cured insulative coating for providing a high level of surface resistivity to minimize interlaminar power losses. The cured insulative coating on the steel sheet includes, based upon 100 parts by dry weight, 20–60 parts of aluminum phosphate, 20–70 parts of at least one inorganic particulate silicate and 10–25 parts of an acrylic resin. The cured coating is formed from an acid aqueous suspension that may include up to 1 part by weight of a water-soluble organic solvent per each part of the resin. The aqueous suspension has a pH of about 2–2.5, a silicate particle size of 0.3–60 μm, a resin particle size of less than 1 μm, less than about 0.5 wt. % unreacted phosphoric acid and a specific gravity of about 1.0–1.3. The silicate may be one or more from the group consisting of aluminum silicate, aluminum potassium silicate and magnesium silicate. After curing, the coating has a thickness on each sheet surface of 0.5–8 μm. The insulative coated nonoriented electrical steels may be used to minimize power losses in laminated magnetic cores of motors, generators, transformers, and other electrical equipment.

20 Claims, No Drawings

INORGANIC/ORGANIC INSULATING COATING FOR NONORIENTED ELECTRICAL STEEL

BACKGROUND OF THE INVENTION

The present invention relates to an inorganic/organic insulative coated semiprocessed or fully processed nonoriented electrical steel providing a high level of surface resistivity to minimize interlaminar power losses. More particularly, the insulative coating is formed from an acid aqueous suspension including a monoaluminum phosphate solution, at least one inorganic particulate silicate and an organic acrylic latex. The insulative coated nonoriented electrical steels of this invention may be used to minimize power losses in magnetic cores of motors, generators, transformers, and other electrical equipment.

Nonoriented electrical steel sheets used for medium and large size motors, generators and transformers require an insulative coating that provides a high level of surface resistivity to minimize interlaminar power losses when laminations formed from the steel are used in an as-punched condition. This high level of surface resistivity may also be required after heat treatments such as stress-relief annealing (SRA) or "burn-off" treatments used to remove winding insulation during motor repair. The insulative coating must have good adhesion to the steel sheet during manufacturing processes so that the coating does not flake from the edges of laminations punched from the steel sheet. The insulative coating also should not powder excessively, should not buildup on feed rolls and other equipment during punching, slitting or shearing, should not abrade dies used to punch or shear the laminations, should allow welding of magnetic cores formed from the laminations at reasonable speeds, and should be compatible with various chemicals and resins used during manufacture or use of the magnetic cores.

It is known to use inorganic phosphate insulative coatings for electrical steel. Inorganic phosphate coatings provide excellent surface resistivity and heat resistance but cause excessive die wear during punching of laminations and tend to have poor adhesion to the steel sheet. For example, U.S. Pat. No. 2,501,846 discloses forming an insulating film from a phosphoric acid solution containing about 7–50% free acid or a solution consisting of phosphoric acid in which magnesia has been dissolved. U.S. Pat. No. 2,743,203 discloses an inorganic phosphate insulative coating for electrical steel formed from a phosphoric acid solution in which aluminum hydrate has been dissolved. U.S. Pat. No. 3,948,786 relates to an improved inorganic phosphate insulative coating for grain oriented electrical steel formed from a solution containing 100 parts by weight of an aluminum-magnesium-phosphate solution, up to 150 parts by weight colloidal silica, and up to 25 parts by weight of chromic anhydride. These prior art inorganic phosphate insulative coatings all cause increased die wear during punching of laminations compared to punching of bare electrical steel. Also, adhesion of these coatings to the steel sheet surface is very dependent upon the nature of the oxide film formed on the surface of the sheet in the operations preceding coating.

It also is known to use inorganic insulative coatings containing an organic resin. The organic resin provides lubricity to the cured coating which reduces the rate of die wear during punching of the coated electrical steel. Inorganic phosphate coatings containing an organic resin provide excellent surface resistivity but may powder excessively during punching, slitting or shearing of the steel and cause build-up of powdered coating on the punching, slitting or shearing equipment. During periods of high humidity, inorganic/organic phosphate coatings may absorb water vapor from the atmosphere and become sticky, causing the coating to build up on feed rolls, dies, tension pads, and other equipment. The accumulated coating must be removed from the equipment by cleaning, thereby impacting productivity. U.S. Pat. No. 4,496,399 relates to an inorganic/organic phosphate insulative coating. This patent discloses an aqueous composition for coating nonoriented electrical steels with the inorganic portion of the composition including 100 parts aluminum-magnesium-phosphate and either 33–250 parts colloidal silica and 10–25 parts chromic anhydride or 30–250 parts of a particulate aluminum silicate. The organic portion of the composition contains 15–1350 parts of an aqueous suspension containing 40–60% by weight solids of an acrylic or vinyl acetate resin. A disadvantage of this coating is that the inorganic portion contains free phosphoric acid which must be reacted with the steel surface at a high temperature and also magnesium phosphate compounds which must be cured at a high temperature to prevent stickiness caused by the presence of unreacted phosphoric acid or hygroscopic phosphate compounds. At this high curing temperature, however, degradation of the resin occurs which results in a non-uniform brown appearance and poor adhesion to the steel sheet. Another disadvantage is that the coating is difficult to apply uniformly across the width of the steel sheet using grooved rubber metering rolls due to occurrence of streaks of thin coating.

U.S. Pat. No. 3,793,073 discloses an inorganic/organic insulative coating for coating electrical steel having a surface roughness of at least 20 Hr.m.s. $\mu$inch. The organic portion of the coating is formed from the group of acrylic acid resins or copolymers, anhydrous maleic acid, amino acid resin, calcium lignin sulfonate, polyvinyl alcohol, phenol resin, vinyl acetate, polyvinyl acetal, alkyd resins, vinyl chloride and epoxy resins. Organic particulate materials such as bakelite, melamine resin or the like having a particle size greater than 2 $\mu$m may be used to provide the surface roughness. The inorganic portion of the coating may include one or more of a phosphoric acid type material or a chromic acid type material. The phosphoric acid type material may include a phosphate of calcium, aluminum, magnesium and zinc as well as titanium oxide, colloidal silica, colloidal alumina and boric acid. The chromic acid type material may include a bichromate of calcium, magnesium, and zinc as well as titanium oxide, colloidal silica, colloidal alumina, boric acid and an organic reducing agent. An electrical steel coated with this inorganic/organic insulative coating has good punching and welding quality. A disadvantage of this coating is that very high surface resistivity, a high stacking factor and acceptable weldability cannot be achieved simultaneously when the base metal surface roughness is greater than 20 Hr.m.s. $\mu$inch. The coating has to be thick to insure good resistivity when applied to a rough sheet surface and this causes the stacking factor to be low and may adversely affect weld porosity. Another disadvantage of a coating having a resin with a particle size greater than 2 $\mu$m is that the resin particles may detach from the steel surface during processing resulting in excessive powdering and powdered coating build-up. Also, this coating may contain chromic acid or chromates which create safety and environmental problems during application of the coating, processing of the coated steel sheet, and disposal of waste coating.

U.S. Pat. No. 4,618,377 discloses an inorganic/organic coating composition for forming an insulative coating on electrical steel comprising an organic emulsion resin, organic resin particles surface-treated with a dispersion improver, and a solution containing at least one inorganic phosphate or chromate component. The surface-treated resin particles are used to control surface roughness of the cured coating thereby improving weldability. The emulsion resin may be acrylic vinyl acetate, styrene, or butadiene alone or a copolymer of one or more of vinyl acetate, styrene, and butadiene. The surface-treated resin particles have a size of 2–50 µm and may include a copolymer or mixture of one or more of polyethylene, polypropylene, polyamide, polyacrylic resin, polystyrene and benzoguanamine. The inorganic portion of the coating may include one or more of a phosphate of calcium, aluminum, magnesium and zinc, chromate or bichromate of calcium, magnesium, zinc or aluminum, and oxide, hydroxide or carbonate of calcium, magnesium, zinc and aluminum dissolved in phosphoric acid or anhydrous chromic acid. The coating is baked to semi-melt the resin particles thereby providing a surface roughness $R_a$ of 0.5–1.5 µm on the cured insulative coating. A disadvantage of this coating is the resin particles tend to powder or flake during processing of the coated steel sheet. Also, the coating may contain chromic acid or chromates which cause safety and environmental problems.

U.S. Pat. No. 4,844,753 discloses an aqueous coating composition for forming an insulative coating on electrical steel comprising an inorganic chromate film-forming component and a resin component. The resin component is a mixture of an acrylic or acrylic-styrene emulsion and guanamine resin having a particle size of 0.2–1 µm. When these inorganic/organic insulative coatings containing a chromate are applied with a very thin thickness, the coating is smooth but has poor surface resistivity. If the chromate insulative coating is applied with sufficient thickness to have high surface resistivity, excessive porosity occurs during welding caused by volatilization of the resin. If particles are added to the chromate insulative coating to minimize weld porosity caused by volatilization of the organic resin during welding, then the coating powders excessively during punching. This chromate insulative coating is undesirable because of safety and environmental problems relating to use of the coating and disposal of the waste by-products containing soluble hexavalent chromium.

It also is known to use insulative coatings for electrical steel containing as the binder one or more water soluble silicates such as sodium silicate, potassium silicate, or ammonium silicate. These coatings have a basic pH rather than the acid pH associated with coatings containing phosphate or chromate binders. Insulative coatings based on soluble silicates may be completely inorganic or they may contain organic material to improve punchability. U.S. Pat. No. 3,839,256 discloses a coating composition containing quaternary ammonium silicate solution and aqueous dispersions of ethylene polymers and ethylenically-unsaturated carboxylic acids or esters, and optionally containing lubricants such as oils to improve lubricity, surfactants to improve wetting or prevent foaming, and fillers to reduce cost. U.S. Pat. No. 4,507,360 discloses addition of a chromate compound selected from the group of strontium chromate, barium chromate, and lead chromate to the composition of U.S. Pat. No. 3,839,256 to improve corrosion resistance. U.S. Pat. No. 4,762,753 relates to an inorganic insulative coating composition for electrical steel containing sodium silicate, magnesium oxide or hydroxide, titanium dioxide, and mica. All of these insulative coatings based on soluble silicates provide good surface resistivity and heat resistance, but they cause poor weld pool fluidity during gas tungsten arc welding resulting in nonuniform, discontinuous welds.

Accordingly, there remains a need for an insulative coating for nonoriented electrical steel sheet that provides good surface resistivity, minimizes interlaminar power losses, has good water vapor absorption resistance, provides good adhesion to the sheet, causes minimal die wear during punching of laminations from the sheet, does not powder excessively during punching of the laminations or cause build-up of coating on the punching equipment, withstands stress-relief annealing and burn-off heat treatments, and does not cause excessive weld porosity. There also is a need for an insulative coating for nonoriented electrical steel sheet that is low cost, is compatible with a variety of chemicals and resins used to manufacture magnetic cores and does not contain chromates that create costly environmental disposal problems. There also is a need for an insulative coating for nonoriented electrical steel sheet that does not create a safety problem during application and use of the coating caused by the presence of hexavalent chromium.

SUMMARY OF THE INVENTION

The present invention relates to a nonoriented electrical steel sheet coated on both surfaces with a cured insulative coating which provides a high level of surface resistivity to minimize interlaminar power losses in magnetic cores of motors, generators, transformers, and other electrical equipment. The cured insulative coating on the steel sheet includes, based upon 100 parts by dry weight, 20–60 parts of aluminum phosphate, 20–70 parts of at least one inorganic particulate silicate and 10–25 parts of an acrylic resin. The cured insulative coating is formed from an acid aqueous suspension containing a monoaluminum phosphate solution, the particulate silicate and an acrylic latex. The suspension may include up to 1 part by weight of a water-soluble organic solvent per each part of the acrylic resin.

Another feature of this invention includes the aforesaid insulative coated electrical steel sheet having a Franklin current no greater than about 0.2 A.

Another feature of this invention includes the aforesaid cured coating having a thickness on each steel surface of 0.5–8 µm.

Another feature of this invention includes the aforesaid silicate having a particle size of 0.3–60 µm.

Another feature of this invention includes the aforesaid suspension having a viscosity of 15–300 cP.

Another feature of this invention includes the aforesaid suspension having a specific gravity of about 1.0–1.3.

Another feature of this invention includes the aforesaid acid aqueous suspension having a pH of about 2.0–2.5 and containing <0.2 wt. % unreacted phosphoric acid.

A principal object of this invention is to provide a composition for forming an insulating coating on a nonoriented electrical steel sheet that has low moisture absorption in a humid atmosphere.

Another object of this invention is to provide an insulating coating composition for forming an insulating coating on a nonoriented electrical steel sheet that provides improved adhesion and reduced powdering, before and after heat treatment such as stress-relief annealing.

Other objects of this invention include providing a composition for forming a cured insulating coating on a nonoriented electrical steel sheet that provides high surface resistivity of the sheet, has good punchability of the sheet, has good weldability of the sheet at reasonable welding speeds with minimal porosity in the weld, can be applied to the sheet using means such as grooved rubber metering rolls resulting in a uniform coating with no bare spots or streaks of thin coating and does not create safety or environmental problems related to the use or disposal of hexavalent chromium.

An advantage of this invention includes a cured insulative coating on a nonoriented electrical steel sheet which has low moisture absorption in a humid atmosphere and does not cause coating build-up on punching, slitting or shearing equipment.

Additional advantages include a composition for forming a cured insulating coating on a nonoriented electrical steel sheet that has improved adhesion and powdering resistance, provides a high level of surface resistivity, does not require a chromate thereby avoiding safety and environmental problems during use and disposal of the coating, and is easily applied to the electrical steel sheet using grooved rubber metering rolls without occurrence of thin coating streaks or other defects.

The above objects, features and advantages, as well as others, will be apparent from the following description of the preferred invention.

DESCRIPTION OF THE PREFERRED EMBODIMENT

The present invention relates to an inorganic/organic insulative coated semiprocessed or fully processed nonoriented electrical steel and a cured insulative coating composition therefor providing a high level of surface resistivity to minimize interlaminar power losses. Nonoriented electrical steel is characterized by having magnetic properties nearly uniform in all directions. These steels are comprised of iron, silicon and/or aluminum to impart higher specific electrical resistivity to the steel sheet and thereby lower core loss. Nonoriented electrical steels also may contain manganese, phosphorus and other elements commonly known to provide higher electrical resistivity which lowers core losses created during magnetization.

The nonoriented electrical steel of this invention is melted, cast and hot processed into continuous lengths of sheet, strip or foil, hereinafter referred to as sheet. The melt composition of the steel contains less than 0.1%, preferably less than 0.01% C; 0.2–3.5%, preferably 1.5–3.3% Si; 0.05–1.5%, preferably 0.2–0.8% Al; 0.05–0.5% Mn, preferably 0.1–0.5% Mn; up to 0.2% P, less than 0.7% Cr, less than 0.1% S, up to 0.2% Sb and/or Sn to inhibit internal oxidation of the steel sheet during annealing, the balance iron and normal residual elements such as Cu, Ti, N and Mo. The sheet may be produced using methods such as ingot casting, thick slab casting, thin slab casting, strip casting, or other methods of compact strip production using the melt composition. If the steel sheet is produced from a slab, the slab is reheated to about 1230° C. and hot-processed such as being hot rolled into a strip thickness of 1.8–2.0 mm suitable for further processing. The hot-processed strip may be optionally annealed, pickled to remove scale, cold reduced about 60–85% in one or more stages and given a final anneal at a peak metal temperature of 870–1070° C. for about 30–40 seconds. After cold reduction but before the final anneal, the steel sheet may be decarburization annealed to reduce carbon to 0.003% or less. During the final anneal, the sheet develops the desired final grain size and a surface oxide layer which serves as a base for an applied insulative coating of this invention. This insulative coating is applied to both surfaces of the final annealed sheet using metering means such as rollers. The insulative coating then is cured by passing the sheet through a furnace, an induction coil, or the like, wherein the sheet is heated to a peak metal temperature of about 220–350° C., preferably 300–330° C.

The nonoriented electrical steel of this invention may be fully processed or semiprocessed. By fully processed nonoriented electrical steel is meant a hot processed steel which is optionally annealed, pickled, cold reduced, decarburized if necessary, final annealed to provide grain growth to develop optimum magnetic properties and then coated with an insulative coating. By semi-processed nonoriented electrical steel is meant cold reduced steel sheet which is not fully decarburized or final annealed to develop the optimum grain size at the steel sheet manufacturing plant. Rather, the final anneal is completed by the customer after punching laminations from the steel sheet.

After final annealing, the nonoriented electrical steel of this invention is coated on both surfaces with an acid aqueous suspension containing, based upon 100 parts by dry weight, 20–60 parts of inorganic monoaluminum phosphate, 20–70 parts of one or more inorganic particulate silicates and 10–25 parts of an acrylic resin. Preferably, the suspension contains up to 1 part by weight of a water-soluble organic solvent per each part of the acrylic resin. The aqueous suspension has a pH of about 2.0–2.5 and preferably about 2.3. The aqueous suspension preferably has a specific gravity of 1.0–1.3 and more preferably about 1.02–1.25. The ratio of mono aluminum phosphate to the acrylic resin, on a dry weight basis, preferably is at least 1.5:1 and more preferably at least 2.0:1. The silicate average particle size i.e., equivalent spherical diameter, preferably is 0.3–60 $\mu$m and more preferably about 0.4–40 $\mu$m. The acrylic resin may be a copolymer of acrylic acid, methacrylic acid, esters of these acids, acrylonitrile and styrene. This copolymer may be a thermoplastic resin or a thermosetting resin containing functional monomers such as glycidyl acrylate, itaconic acid, and hydroxyethyl acrylate. The water-soluble organic solvent may include one or more glycol ether solvents, one or more of various alcohols, or mixtures thereof. The suspension can be metered uniformly completely across the entire width of the steel sheet. Unlike prior art phosphate coatings which may contain a large amount of free phosphoric acid, the acid aqueous suspension of this invention contains only a small amount of unreacted free phosphoric acid. By small amount of free phosphoric acid is meant the acid aqueous suspension of this invention contains less than about 0.2 wt. % unreacted phosphoric acid. A high temperature of $\geq 400°$ C. typical of the prior art is not required during curing of the coating of this invention to prevent stickiness otherwise caused by unreacted phosphoric acid or the presence of hygroscopic magnesium or magnesium-aluminum phosphate compounds. Accordingly, the liquid coating on the steel sheet can be cured at a peak metal temperature of about 325° C. The thickness of the cured, tack-free insulative coating on each sheet surface is at least 0.5 $\mu$m, preferably 2–8 $\mu$m. The insulative coated nonoriented electrical steels of this invention may be used to minimize power losses in laminated magnetic cores of motors, generators, transformers, and other electrical equipment.

The cured insulative coating of this invention contains 20–60, preferably 30–50 parts, of inorganic aluminum phosphate. An essential feature of this invention is for the cured insulative coating to contain at least 20 parts, i.e., 20 dry wt. %, of aluminum phosphate. A lesser amount of aluminum phosphate in the cured insulative coating causes the coating to have an increased tendency to powder during processing. The cured insulative coating should not contain more than 60 parts, i.e., 60 dry wt. %, of the aluminum phosphate because die wear may become excessive during punching of the insulative coated sheet.

The cured insulative coating of this invention also contains 10–25 parts of an acrylic resin, preferably 15–20 parts of the resin. Another essential feature of this invention is for the cured insulative coating to contain at least 10 parts acrylic resin, i.e., 10 dry wt. %, to prevent excessive die wear during punching. The cured insulative coating should not contain more than 25 parts acrylic resin, i.e., 25 dry wt. %, to avoid weld porosity caused by volatilization of the resin. When the cured insulative coating does not exceed 25 parts acrylic resin, the hardness of the coating is not significantly decreased and is adequate for normal handling and processing of coated electrical steel laminations.

By acrylic latex will be understood to mean a stable dispersion of a polymeric acrylic particulate resin in an essentially aqueous medium. It is important that the organic component of the coating of this invention remain as a stable fine dispersion when mixed with the acid aqueous coating suspension. The acrylic resins of this invention have a particle size generally no greater than 1 $\mu$m, preferably less than 0.5 $\mu$m. It is important that the organic component of this invention be added to the acid aqueous suspension as an acrylic latex because this eliminates the need for a large amount of organic solvent to solubilize the organic component and results in a coating with a low volatile organic compound content. Acceptable resins include copolymers of acrylic acid, methacrylic acid, esters of these acids, styrene and acrylontrile. Functional monomers such as glycidyl acrylate, itaconic acid, and hydroxyethyl acrylate may be included to provide reactive sites for crosslinking.

Another essential feature of this invention is for the composition to contain 20–70, preferably 25–65 parts of at least one inorganic particulate silicate. The cured insulative coating should contain at least 20 parts, i.e., 20 dry wt. %, of particulate silicate to provide adequate abrasion resistance, to prevent lowering of the surface resistivity and to maintain good weldability. The cured insulative coating should not contain more than 70 parts, i.e., 70 dry wt. %, of particulate silicate because the coating would have a tendency to powder during processing.

The silicate particle size of this invention also is important and preferably should be within the range of 0.3–60 $\mu$m. The silicate particle size affects the roughness of the cured coating which can affect weldability and powdering during processing. The particle size should not be less than 0.3 $\mu$m because the coating surface will be too smooth to prevent weld porosity, and the coefficient of friction may be too low for some applications. The particle size should not be greater than about 60 $\mu$m because powdering of the coating will occur during processing and after annealing. Acceptable particulate silicates suitable for this invention include those characterized as being inorganic, insoluble, and having a plate-like laminar structure such as aluminum silicate, aluminum potassium silicate or magnesium silicate.

The acid aqueous coating composition of the present invention may contain up to 1 part of a water soluble organic solvent per each part of the acrylic resin in order to prevent defects in the cured coating such as small bare spots or thin coating streaks. At coating line speeds above about 20 m/min, it is desirable to include the solvent in the aqueous suspension to prevent formation of coating streaks caused when excess coating is removed from the steel sheet using grooved rubber rollers. The water soluble organic solvent also improves wetting of the steel surface by the aqueous coating suspension resulting in improved uniformity and coverage across the entire width of the steel sheet. Acceptable water soluble organic solvents include glycol ethers or various alcohols. Preferably, the amount of the water soluble organic solvent is at least 0.2 for each part of the acrylic resin. If the amount of the water soluble organic solvent is greater than 1 part per each part of the acrylic resin, the stability of the aqueous suspension may be poor resulting in excessive increase in viscosity during use and over time during storage. Also, the water soluble organic solvent preferably should have a Davies Hydrophile-Lipophile Balance (HLB) value of at least about 7 to prevent excess viscosity increase over time. If the amount of the water soluble organic solvent is greater than 1 part per each part of the acrylic resin, the amount of volatile organic compounds released during curing of the coating will be high resulting in increased environmental pollution.

Another important consideration to obtain uniform coverage across the full width of the steel sheet is coating viscosity. The viscosity should be about 15–300 cP and preferably about 60–200 cP as measured by a Brookfield LVF viscometer, LV2 spindle, 60 rpm. If the viscosity is lower than about 15 cP, streaks of bare or thin coating are more likely to occur during application with grooved rubber metering rolls, silicate particles settle from suspension more rapidly, and the surface of the cured insulative coating may be too smooth to provide adequate weldability. If the viscosity is greater than about 300 cP, the coating does not level well after application with grooved metering rolls and a pronounced roll groove pattern will remain in the cured coating, which may adversely affect the space factor, corrosion resistance, and slideability during processing of the coated sheet. A viscosity range of 60–200 cP is preferred to minimize streaking and produce a cured coating with proper surface roughness to optimize weldability.

The coating composition of the present invention also may contain small amounts of additives such as surface active agents to improve wetting, reduce foaming, and improve dispersion of the silicate particles; cross-linking agents to increase the insulative coating hardness and to improve chemical resistance; and slip agents to improve lubricity and mar resistance. Also, water-reducible acrylic resins which are stable at a low pH of about 2.0–2.5 may be added to the coating suspension to improve flow characteristics and chemical resistance of the cured coating.

The coating composition can be applied to each surface of the steel sheet by means for metering uniformly across the entire width of the sheet surfaces such as by grooved rubber rollers, contact rollers, squeegees, spraying or by immersion. Excess coating can be removed from the surfaces of the sheet using grooved rubber rollers, air knives and the like. The liquid coated sheet then can be passed through a furnace where the composition is heated to a peak metal temperature of at least 220° C., preferably at least 300° C., in about 15–30 seconds or cured by induction in about 5 seconds. After being cured, the thickness of the dry insulative coating on each surface should be at least about 0.5 $\mu$m, preferably at least 2.0 $\mu$m. The coating thickness should be at least about 0.5 $\mu$m because a high level of surface resistivity will not be achieved if the thickness is lower. The coating thickness should not exceed about 8 $\mu$m because the space factor of the lamination stack will be adversely affected. Also, there is more tendency for the insulative coating to powder and exhibit weld porosity if the thickness of the coating is greater than about 8 $\mu$m. After curing, the insulative coated electrical steel sheet has a Franklin current (ASTM 717) no greater than about 0.2 A at 2.1 MPa and 21° C.

EXAMPLE 1

By way of example, fully-processed nonoriented electrical steel sheets of the present invention were coated in a laboratory with an acid aqueous suspension containing a monoaluminum phosphate solution, an inorganic particulate silicate, an acrylic latex, and a water-soluble organic solvent. This aqueous suspension, hereinafter referred to as Invention Coating I, was prepared in the following manner. On a dry weight basis of 100 parts total solids, 21.1 parts of acrylic resin were added to a mixing vessel. The acrylic latex is manufactured by Union Carbide Corporation, UCAR Emulsion Systems, in Cary, North Carolina and sold under the trade name UCAR Vehicle 443. It contains 41 wt. % styrene-acrylic polymer and about 59 wt. % water. The styrene-acrylic polymer particles in the latex have an average diameter of 0.15 $\mu$m. A water soluble organic solvent, diethylene glycol monobutyl ether, then was added to the acrylic latex. This solvent is manufactured by Union Carbide Corporation, Solvents and Coatings Materials Division, in Danbury, Connecticut and is sold under the trade name Butyl Carbitol. The amount of organic solvent added was 0.073 part per each part acrylic resin. On a dry weight basis, 41.0 parts of particulate aluminum silicate then were added while stirring vigorously to obtain good dispersion of the silicate particles. The aluminum silicate is manufactured by Englehard Corporation, Specialty Minerals and Colors Group, and is sold under the trade name ASP 200. It is a hydrous aluminum silicate derived from kaolin with an average particle size of 0.4 $\mu$m, loss on ignition of 14%, and pH of 3.5–5.0. On a dry weight basis, 37.5 parts of aluminum phosphate were added to the mixture of particulate silicate particles and acrylic latex. The aluminum phosphate was added in the form of a monoaluminum phosphate solution, which is available from Interstate Chemical Company in Hermitage, Pennsylvania and sold under the trade name Monoaluminum Phosphate. Monoaluminum phosphate solution is a 50 wt. % solution of $Al(H_2PO_4)_3$ in water with a specific gravity of 1.47. The specific gravity of the resulting acid suspension was adjusted to about 1.14 by adding water. Fully-processed nonoriented electrical steel sheets having a thickness of 0.47 mm were coated with Invention Coating I using grooved rubber metering rolls and then cured in an oven set at 482° C. for 32 seconds resulting in a peak metal temperature of the steel sheet of 232° C. The thickness of the cured dry film was about 2.3 $\mu$m per side.

For comparison with the above Invention Coating I, two types of inorganic/organic chromate insulative coatings were prepared based on prior art teachings. First, an inorganic/organic chromate coating with a smooth surface, hereinafter referred to as Smooth Chromate Coating, was prepared by mixing the following components, on a dry weight basis of 100 parts total solids: 47.8 parts chromic anhydride ($CrO_3$), 14.3 parts magnesium oxide (MgO), 10.5 parts boric acid ($H_3BO_3$), and 27.4 parts acrylic resin (Union Carbide UCAR 443 Vehicle). Also, 20 parts glycerin were added per 100 parts chromic anhydride to reduce hexavalent chromium to trivalent chromium during curing.

The specific gravity was adjusted to about 1.14 by adding water. Nonoriented electrical steel sheets were coated with this prior art composition using grooved rubber metering rolls and the coating was cured at 482° C. for about 46–48 seconds, resulting in a peak metal temperature of about 292–300° C. The thickness of the cured coating was 2.2–2.5 $\mu$m. The second type of inorganic/organic chromate coating prepared for comparison had a rough surface due to addition of large organic particles, and is hereinafter referred to as Rough Chromate Coating. On a dry weight basis this coating contained: 47.8 parts chromic acid, 14.3 parts magnesium oxide, 10.5 parts boric acid, 19.2 parts acrylic resin (UCAR 443 acrylic resin), and 8.1 parts polyethylene particles with average particle size of 18 $\mu$m. The polyethylene particles are manufactured by Shamrock Technologies Inc. in Newark, N.J., and sold commercially under the trade name Texture Ultra Fine. The large organic particles were added to increase surface roughness and decrease weld porosity according to the teachings in U.S. Pat. Nos. 3,793,073 and 4,618,377. Sheets of coated nonoriented electrical steel were prepared using this composition following the same procedure described previously for the Smooth Chromate Coating.

For additional comparison, two types of commercially available and widely-used inorganic/organic phosphate insulative coatings, hereinafter referred to as Commercial Phosphate Coatings I and II, were used to coat fully-processed nonoriented electrical steel in the laboratory. Both of these coatings are proprietary water-soluble coatings containing inorganic phosphate components, inorganic particulate silicates, and organic resins. One difference between Commercial Phosphate Coatings I and II is that the inorganic particulate particles in Commercial Phosphate II are larger than those in Commercial Phosphate I, resulting in a rougher as-cured coating film. Both of these coatings were diluted with water to a specific gravity of 1.13–1.14, applied to the steel sheets using grooved rubber metering rolls, and cured for 24–26 seconds at 482° C., resulting in a peak metal temperature of about 200–210° C. The thickness of the cured coating films was 2.3–2.5 $\mu$m.

The results of tests conducted on the coated steel sheets are shown in Table 1. Resistance to powdering was evaluated based on the amount of powdering which occurred when two coated samples were rubbed against one another under constant pressure for a given number of cycles using a Sutherland Ink Rub Tester. Adhesion was evaluated by bending coated samples 180° around a 6.4 mm diameter mandrel and rating the amount of coating pulled off from the outer surface of the bend with transparent tape. Adhesion was also evaluated after stress-relief annealing (SRA) the coated samples at 816° C. for one hour in dry 95% nitrogen and 5% hydrogen by bending samples 180° around a 12.7 mm diameter mandrel and rating the amount of coating pulled off with transparent tape. Surface resistivity was tested in the as-coated condition and after stress-relief annealing at 816° C. using a Franklin tester in accordance with ASTM A 717. Weldability was evaluated on 7 cm high stacks of coated samples using gas tungsten arc welding in the flat position with a clamping pressure of 1.2 MPa, 2.4 mm diameter thoriated tungsten electrode, argon shielding gas at a flow rate of 0.85 $m^3$/min, voltage of 14–15 V, currents from 100–250 A, and welding speeds from 25–152 cm/min. The amount of porosity in the welds and continuity of the welds were evaluated for each coating and welding condition.

The coating of this invention and the four comparative coatings are ranked from best to worst for each property evaluated in Table 1. Further, the results are categorized as acceptable or marginal/unacceptable based on known requirements for electrical steel insulative coatings. None of the comparative coatings were completely acceptable. Invention Coating I was judged to be acceptable in all categories except for weldability. Excessive weld porosity was observed under welding conditions likely to be used in production for joining laminations in magnetic cores. Invention Coating I had less tendency to powder when rubbed which should result in less powder build-up during punching and slitting operations. Invention Coating I had excellent adhesion to the steel sheet before and after annealing and also provided a high level of surface resistivity after annealing.

In order to determine if weld porosity could be reduced by increasing surface roughness, additional larger silicate particles were added to Invention Coating I. The following composition, hereinafter referred to as Invention Coating II, was prepared, all components being expressed on a dry-weight basis with 100 parts total solids: 20.1 parts of an acrylic resin (Union Carbide UCAR 443 Vehicle described previously in Example 1), 26.9 parts of a particulate aluminum silicate (Englehard ASP 200 described in Example 1), 3.9 parts of a particulate aluminum potassium silicate, and 49.2 parts aluminum phosphate. The particulate aluminum potassium silicate is manufactured by Aspect Minerals Inc. in Spruce Pine, North Carolina, and sold under the trade name AlbaFlex 200. The aluminum potassium silicate is a high purity wet ground muscovite mica with an average particle size of 22–27 μm, loss on ignition of 4.27%, and a pH of 7–8. Fully-processed nonoriented electrical steel sheet samples were coated with Invention Coating II and cured in the same manner as described previously for Invention Coating I. The thickness of the cured coating film was about 2.0 μm. Weldability of Invention Coating II was evaluated using the same conditions as for Invention Coating I described above. The occurrence of weld porosity was significantly reduced compared to Invention Coating I.

of sheet. The coated samples then were placed in a humidity chamber maintained at a temperature of 21° C. and a relative humidity of 99–100% (non-condensing) for 48 hours. After removal from the humidity chamber, the samples were reweighed immediately and the weight gain, or amount of water absorbed by each coating, was calculated as a percentage of the original coating weight. The results are summarized below.

|  | Water Absorption (% of coating weight) |
| --- | --- |
| Invention Coating II | 9 |
| Commercial Phosphate Coating I | 26 |

Duplicate samples of Invention Coating II and Commercial Phosphate Coating I were sent to an electric motor manufacturer in a geographic location with a humid climate for evaluation of the tendency to become sticky during humid weather. This motor manufacturer had experienced problems with coating build-up on punching equipment caused by sticky coating in the past. The samples were evaluated for stickiness during a humid time period when production material with a commercially available phosphate inorganic/organic coating (Commercial Phosphate Coating I) in this location was causing severe build-up problems on the punch press feed rolls. Based on touching the coated samples with a bare hand, the samples with Commercial Phosphate Coating I were judged to be very

TABLE 1

| Resistance to Powdering Sutherland Rub Test | Adhesion - As-Cured 6.4 mm Bend Test | Adhesion - After SRA 12.7 mm Bend Test | Weld Porosity GTAW Weldabiliy | As-Cured Surface Resistivity Franklin Test Current (A) | Surface Resistivity After SRA Franklin Test Current (A) |  |  |
| --- | --- | --- | --- | --- | --- | --- | --- |
| Smooth Chromate | Invention Coating I | Invention Coating I | Rough Chromate | Commercial Phosphate II (.02 A) | Rough Chromate (.16 A) |  | Best |
| Invention Coating I | Commercial Phosphate I | Smooth Chromate | Commercial Phosphate II | Commercial Phosphate I (.04A) | Invention Coating I (.26 A) |  |  |
| Rough Chromate | Smooth Chromate | Rough Chromate | Invention Coating II* Commercial Phosphate I | Rough Chromate (.05 A) Invention Coating I (.08 A) | Smooth Chromate (.27 A) Commercial Phosphate II (.35A) Commercial Phosphate I (.36 A) | Acceptable ↑ |  |
| Commercial Phosphate I Commercial Phosphate II | Rough Chromate | Commercial Phosphate I Commercial Phosphate II | Smooth Chromate Invention Coating I | Smooth Chromate (.13 A) |  | ↓ Marginal or Unacceptable | ↓ Worst |

*Weldability was the only property evaluated for Invention Coating II
- Sutherland rub test: 950 cycles, 85 cycles per minute, 2 lb (9.08 kg) load, amount of powdering rated visually
- As-cured adherence: 180° bend around 6.4 mm (0.25 inch) diameter mandrel, transparent tape on tension surface
- After SRA (stress-relief anneal) adherence: 180° bend around 12.7 mm (0.5 inch) diameter mandrel, transparent tape on tension surface
- SRA conditions: 816° C. (1500° F.) soak, 1 hour, dry 95% $N_2$–5% $H_2$
- GTAW Conditions: flat position, Argon shielding gas at 0.85 m3/min, Voltage 14–15 V, Current 100–250 A, Travel Speed 25–152 cm/min, Clamping Pressure 0.12 kg/mm2
- Franklin Test Conditions: 300 psi, 21° C.

EXAMPLE 2

Samples of nonoriented electrical steel sheet were coated in the laboratory with Invention Coating II and Commercial Phosphate Coating I, described previously in Example 1, and tested for water absorption in a humid atmosphere. Each coating was applied and cured as described in Example 1. The samples were weighed before coating and again after curing the coating to determine the coating weight in $g/m^2$ sticky, similar to the production material. The samples coated with Invention Coating II were not sticky.

These results show that Invention Coating II has less tendency to absorb water from a humid atmosphere and become sticky compared to a widely-used commercial phosphate inorganic/organic coating.

EXAMPLE 3

An aqueous acid suspension having the same composition as Invention Coating II in Example 1 was used to coat two coils (approximately 15 metric tons) of nonoriented electrical steel having a thickness of 0.47 mm on a production coating line. The specific gravity of the coating suspension was adjusted to 1.125 by adding water. The coating was applied to both surfaces of steel sheet moving at a line speed of 23 m/min using grooved rubber metering rolls. The line speed was limited to 23 m/min because streaks of thin or bare coating formed at faster speeds. After coating, the steel sheet was passed through a 12 m long furnace with open flame gas burners to cure the coating. The residence time of the sheet in the furnace was approximately 30 seconds and the peak metal temperature was about 329° C. After passing through the curing furnace, the sheet was cooled to near room temperature and coiled up at the exit end of the coating line. The cured coating had a tack-free, smooth, uniform light gray appearance. Occasionally, small bare spots were visible in the cured film due to poor wetting of the steel surface. Results of tests conducted on samples obtained from the production coils are summarized in Table 2.

TABLE 2

| | |
|---|---|
| Coating Thickness ($\mu$m) | 1.7 |
| Franklin Current (A): | |
| As-Cured | .12 |
| After-SRA (816° C., 1 hr, dry 95% $N_2$–5% $H_2$) | .49 |
| After Burn-Off in Air (482° C. for 16 hr.) | .07 |
| Adhesion: | |
| As-Cured (12.7 mm bend) | No Flaking |
| After SRA (flat tape test) | No Flaking |
| After Burn-Off in Air (flat tape test) | No Flaking |
| Chemical Resistance: | |
| Surface pH (litmus paper test) | 5–6 |
| Methyl Alcohol Rub Test | No Attack |

The coating thickness was slightly lower than desired because the coating suspension had to be diluted with water to a specific gravity of 1.125 to avoid major problems with streaking. As a result, the as-cured Franklin current values were slightly higher than desired but still quite acceptable for application in large rotating machines. The Franklin current also was good after SRA at 816° C. in a $H_2$—$N_2$ atmosphere and after a simulated motor stator insulation stripping treatment or burn-off in air at 482° C. for 16 hours. Adhesion of the coating to the steel sheet was excellent as-cured and after SRA and burn-off treatments. The coating was resistant to methyl alcohol and did not show evidence of residual surface acidity as measured by a wet litmus paper test. The following operational advantages of Invention Coating II compared to commercially available and widely-used phosphate inorganic/organic insulative coatings such as Commercial Phosphate Coating I in Example 1 were observed during the trial: (1) Invention Coating II is less sensitive to overheating which occurs during coating line stops, resulting in more consistent color and appearance, (2) Invention Coating II causes less odor during application and curing, (3) Invention Coating II does not dust or build-up on the edges of the sheet on the coating line, and (4) silicate particles in Invention Coating II do not settle from suspension in the coating pan as readily as Commercial Phosphate Coatings, resulting in easier clean-up.

Experimental coated nonoriented electrical steel from this trial was sent to a manufacturer of electric motors and followed through processing to evaluate ease of assembly into stators and rotors, especially the tendency for coating build-up to occur on punching equipment during high humidity. After punching stator and rotor laminations from this steel under various ambient temperature and humidity conditions, it was concluded that Invention Coating II did not become sticky and cause build-up of coating on the punching equipment. Adherence of the coating to the steel sheets was judged to be excellent as-cured, and the coating did not generate much dust or powder during punching. Invention Coating II was judged to be acceptable for aluminum die casting of squirrel cage rotors since it did not cause porosity in the aluminum casting. A test stator core was subjected to a vacuum pressure impregnation (VPI) process in which it was impregnated with an epoxy resin. After this process, the core with Invention Coating II showed no bubbles in the cured epoxy impregnating resin and no other problems. Commercial Phosphate Coating I caused severe bubbling of the epoxy impregnating resin in the same VPI process due to release of absorbed water from the coating during the heating cycle used to cure the epoxy. The only problem observed with Invention Coating II during the motor core manufacturing process was slight abrasion of the bottom surface during punching caused by rubbing of the coating on support plates, rolls, etc. on the punching line.

This first production trial showed that coatings of the present invention: (1) eliminated problems associated with punching of commercially available phosphate inorganic/organic coatings during periods of high ambient humidity, (2) caused less odor during application and curing, (3) did not dust or build-up on the edges of the sheet on the coating line, and (4) were more easily applied and clean-up after coating was easier because silicate particles did not settle from suspension as readily as Commercial Phosphate Coatings. This first production trial further showed that coatings of the present invention meet many of the requirements for insulative coatings used in magnetic cores of large rotating machines. Disadvantages of this invention were also identified including a tendency for streak-type defects to occur during application of the coating with grooved metering rolls, slightly poor wetting resulting in small bare spots in the cured coating film, and slight abrasion of the bottom surface during punching. These problems were solved by adding a small amount of water soluble organic solvent and by increasing the amount of particulate silicate in the formulation, as shown in Examples 4 and 5.

EXAMPLE 4

A trial was conducted on a production coating line using the following coating composition, on a dry weight basis:

| | |
|---|---|
| Acrylic resin | 14.8 |
| Aluminum Silicate | 22.8 |
| Aluminum Potassium Silicate | 22.8 |
| Aluminum Phosphate | 39.6 |

The ingredients used to prepare the coating were the same as those described in the previous examples. This coating composition, hereinafter referred to as Invention Coating III, differs from Invention Coating II in that the content of aluminum potassium silicate is higher. The acid coating suspension had a specific gravity of 1.20 and was applied to the steel strip using grooved rubber metering rolls. Four coils of 0.47 mm thick nonoriented electrical steel were coated at a line speed of 40 m/min. The coated steel strip was passed through a 12 m long open flame furnace to cure the coating at a peak metal temperature of 327° C.

Some problems with streaks of bare or thin coating occurred when the line was restarted after stops, but once the line speed reached steady state at 40 m/min there was no streaking. The cured coating had a uniform, white-gray appearance. Results of tests conducted on samples obtained during the trial are Table 3.

TABLE 3

| Coating Thickness ($\mu$m) | 2.5–3.0 |
|---|---|
| Franklin Current (A) | |
| As-Cured | .02 |
| After SRA - 816° C., 1 hr, dry 95% $N_2$–5% $H_2$ | .30 |
| After Burn-Off in Air (482° C., 16 hr) | .03 |
| Stacking Factor (%) | 97–98 |
| Water Absorption -100% RH, 48 hr (% of coat. Wt.) | 5 |
| Chemical Resistance (Cotton Swab Rub Test - 100 Rubs) | |
| Water | No Attack |
| Methyl Alcohol | No Attack |
| VPI Epoxy | No Attack |
| Adherence | |
| As-Cured (3.2 mm diameter bend/tape test) | No Flaking |
| After SRA (6.4 mm diameter bend/tape test) | |
| Powder | None |
| Bend (tension surface) | No Flaking |
| After Burn-Off | No Flaking |
| Weld Porosity | |
| 38 cm/min Weld Speed | None |
| 76 cm/min Weld Speed | None-Light |
| 152 m/min Weld Speed | Medium-Heavy |

These results show that Invention Coating III provides excellent surface resistivity, stacking factor, and adherence. Further, the coating absorbs much less water when exposed to high humidity compared to commercially available phosphate inorganic/organic coatings, which results in reduced stickiness and reduced tendency for coating build-up on punching and slitting equipment. The TIG weldability of electrical steel sheet coated with Invention Coating III is improved compared to Invention Coating II due to increased content of aluminum potassium silicate. At most light porosity was observed in the welds at weld travel speeds up to 76 cm/min, which should provide acceptable productivity for most applications. This level of weldability is similar to that achieved with Commercial Phosphate Coating I described previously.

After slitting the steel coils coated with Invention Coating III only very minor rub marks and scratches were observed on the surfaces in contact with the tension pads, which indicates that abrasion resistance of the coating was improved compared to Invention Coating II. Nonoriented electrical steel material coated with Invention Coating III was assembled into motors with no processing problems such as build-up of coating on punching equipment.

This trial showed that increasing the amount of potassium aluminum silicate for Invention Coating III compared to Invention Coating II resulted in improved weldability and abrasion resistance. Both of these properties were improved to acceptable levels. The only deficiency of Invention Coating III was a tendency for streaks of bare or thin coating during application with grooved metering rolls at slow coating line speeds.

EXAMPLE 5

A trial was conducted in which 0.47 mm thick nonoriented electrical steel was coated with the same composition as Invention Coating III except that 0.20 parts of ethylene glycol monobutyl ether and 0.20 parts of isopropyl alcohol were added per each part of acrylic resin. Both of these solvents are water-soluble organic solvents which lower the surface tension of waterborne coatings. Laboratory work showed that addition of one or more water-soluble solvents reduced the tendency for streaking during application with grooved metering rolls significantly in the laboratory. Ethylene glycol monobutyl ether is manufactured by Union Carbide Corporation, Solvents and Coatings Materials Division, Danbury, Conn. and sold under the trade name Butyl Cellosolve. After addition of Butyl Cellosolve and isopropyl alcohol to the coating, water was added to achieve a final specific gravity of 1.20. The coating, hereinafter referred to as Invention Coating IV, was applied to the electrical steel strip at a line speed of 40 m/min using grooved rubber metering rolls as described previously and cured in a 12 m long furnace at a peak metal temperature at 327° C.

There was no streaking during application of the coating after line stops nor at steady state line speed. Wetting of the steel surface was also improved compared to previous trials in which no organic solvents were added to the coating, resulting in fewer occurrences of small bare spots. The as-cured coating had a uniform, matte, white-gray appearance. The coating thickness ranged from 1.8 to 2.9 $\mu$m per side and the as-cured Franklin current was 0–0.01 A. Adherence of the coating was acceptable based on a 12.7 mm diameter bend test. The experimental coated nonoriented electrical steel was supplied to a manufacturer of motors and processed into magnetic cores with no problems such as coating build-up or powdering during punching.

This trial shows that addition of one or more water-soluble organic solvents to the coatings of the present invention eliminates problems with streaking of the coating during application with grooved rubber metering rolls and also improves wetting of the steel surface by the coating, resulting in more uniform coverage. No properties of the as-cured coating were adversely affected by addition of the organic solvents.

It will be understood that various modifications may be made to the invention without departing from the spirit and scope of it. Therefore, the limits of the invention should be determined from the appended claims.

What is claimed is:

1. A nonoriented electrical steel sheet coated on both surfaces with an insulative coating for providing a high level of surface resistivity to minimize interlaminar power losses, the coating consisting essentially of:

an inorganic/organic cured coating containing 20–60 parts of aluminum phosphate, 20–70 parts of at least one inorganic particulate silicate and 10–25 parts of an acrylic resin, based upon 100 parts by dry weight, the coating formed from an acid aqueous suspension containing a monoaluminum phosphate solution, the particulate silicate and an acrylic latex, the suspension including up to 1 part by weight of a water-soluble organic solvent per each part of the acrylic resin.

2. The coated steel sheet of claim 1 having a Franklin current no greater than about 0.2 A.

3. The coated steel sheet of claim 1 wherein the coating has a thickness on each surface of at least 0.5 $\mu$m.

4. The coated steel sheet of claim 1 wherein the coating has a thickness on each surface of 2–8 $\mu$m.

5. The coated steel sheet of claim 1 wherein the coating contains 30–50 parts of the aluminum phosphate.

6. The coated steel sheet of claim 1 wherein the coating contains 25–65 parts of the particulate silicate.

7. The coated steel sheet of claim 1 wherein the coating contains 15–20 parts of the acrylic resin.

8. The coated steel sheet of claim 1 wherein the silicate has a particle size of 0.3–60 μm.

9. The coated steel sheet of claim 1 wherein the acrylic resin has a particle size ≦1 μm.

10. The coated steel sheet of claim 1 wherein the ratio of the aluminum phosphate to acrylic resin is at least 1.5:1.

11. The coated steel sheet of claim 1 wherein the suspension has a viscosity of 15–300 cP.

12. The coated steel sheet of claim 1 wherein the suspension has a pH of 2.0–2.5 and a specific gravity of 1.0–1.3.

13. The coated steel sheet of claim 1 wherein the silicate is selected from the group consisting of aluminum silicate, aluminum potassium silicate and magnesium silicate.

14. The coated steel sheet of claim 1 wherein the acrylic resin is selected from the group consisting of copolymers of acrylic acid, methacrylic acid, esters of these acids, acrylontrile and styrene.

15. The coated steel sheet of claim 1 wherein the coating is cured at a temperature of 220–350° C.

16. The coated steel sheet of claim 1 wherein the acid aqueous suspension contains less than about 0.2 wt. % unreacted phosphoric acid.

17. The coated steel sheet of claim 1 wherein the ratio of aluminum phosphate to acrylic resin in the cured coating is >1.5.

18. A nonoriented electrical steel sheet coated on both surfaces with an insulative coating for providing a high level of surface resistivity to minimize interlaminar power losses, the coating consisting essentially of:

an inorganic/organic cured coating containing 20–60 parts of aluminum phosphate, 20–70 parts of a silicate having a particle size of 0.3–60 μm and 10–25 parts of an acrylic resin, all parts based upon 100 parts by dry weight of the coating, the cured coating thickness on each surface being at least 0.5 μm wherein the insulative coated sheet has a Franklin current no greater than about 0.2 A.

19. A nonoriented electrical steel sheet coated on both surfaces with an insulative coating for providing a high level of surface resistivity to minimize interlaminar power losses, the coating consisting essentially of:

an inorganic/organic cured coating containing 30–50 parts of aluminum phosphate, 25–65 parts of a silicate having a particle size of 0.4–40μm and 15–25 parts of an acrylic resin having a particle size less than 1μm, all parts based upon 100 parts by dry weight of the coating, the cured coating thickness on each surface being 0.5–8μm wherein the insulative coated sheet has a Franklin current no greater than about 0.2 A.

20. A nonoriented electrical steel sheet coated on both surfaces with an insulative coating for providing a high level of surface resistivity to minimize interlaminar power losses, the coating consisting essentially of:

an inorganic/organic cured coating containing 30–50 parts of aluminum phosphate, 25–65 parts of a silicate having a particle size of 0.4–40 μm and 15–25 parts of an acrylic resin having a particle size less than 1 μm, all parts based upon 100 parts by dry weight of the coating, the coating formed from an acid aqueous suspension containing a monoalurinum phosphate solution, the particulate silicate and an acrylic latex, the acid aqueous suspension containing less than about 0.2 wt. % unreacted phosphoric acid and 0.2–1 part by weight of a water-soluble organic solvent per each part of the acrylic resin, the coating thickness on each surface being 0.5–8 μm wherein the insulative coated sheet has a Franklin current no greater than about 0.2 A.

* * * * *